March 9, 1971  M. L. HOFFMAN  3,568,461
FRACTIONATION APPARATUS
Filed Nov. 22, 1967  2 Sheets-Sheet 1

INVENTOR.
MICHAEL L. HOFFMAN
BY Max Selden
ATTORNEY

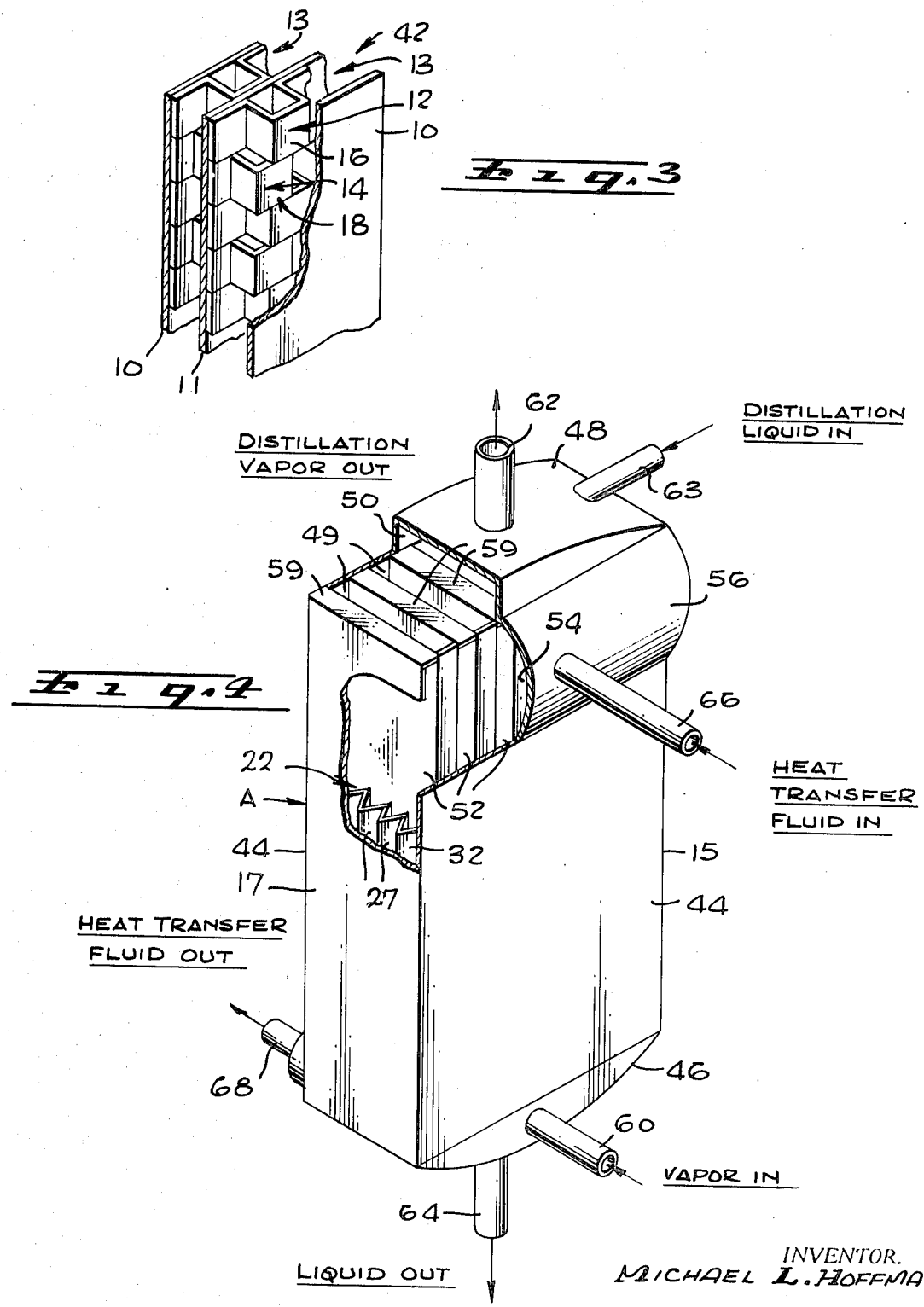

3,568,461
FRACTIONATION APPARATUS
Michael L. Hoffman, Beverly Hills, Calif., assignor to
McDonnell Douglas Corporation, Santa Monica, Calif.
Filed Nov. 22, 1967, Ser. No. 685,012
Int. Cl. B01d 3/16; F25j 3/00
U.S. Cl. 62—42                                    5 Claims

ABSTRACT OF THE DISCLOSURE

Fractionating apparatus comprising two series of corrugated vertically spaced sheets, each of the two series of sheets extending horizontally, one series of such sheets being offset from the other series, and forming a plurality of vertical channels or paths so that a vapor or vapor mixture to be separated and passing upwardly through such channels impinges on the vertical surfaces of the alternate offset walls of the corrugations of the respective offset series of corrugated sheets, and in contact with a liquid film flowing downwardly on such vertical surfaces, providing an efficient fractionation. In a preferred embodiment, a plurality of such fractionating units are positioned parallel to each other, with a passage or passages for an external heat transfer fluid provided between adjacent units to supply heat to or to remove heat from the adjacent fractionating units.

---

This invention relates to fractionating apparatus, and is particularly concerned with novel fractionating structures and fractionating columns embodying such structures to achieve more efficient fractionation.

The novel fractionating structures and column containing same of the invention are particularly employed in the processing of gaseous mixtures for liquefaction or for separation of the components of such mixtures, e.g., for the separation of components of air, or the components of gaseous mixtures of nitrogen and hydrocarbons such as methane, and the like. However, the utility of the invention apparatus is not limited to such applications.

Various types of internal packing in the form of plate-fin constructions have been designed in the prior art in an effort to obtain greater fractionation efficiency. One such design is that disclosed in U.S. Patent 2,885,195. In such construction, inclined corrugated plates with slots therein are provided for passage of the liquid-vapor mixture being separated, liquid reflux passing downwardly through the channels collecting in the upwardly inclined troughs formed by the corrugations until it overflows through the slots, the vapor passing upwardly through the channels via the slots impinging on the liquid film flowing from the respective slots.

Although this type of construction seeks to achieve improved vapor-liquid contact, the surface density of the type of material employed in the construction of the above patent is only about one-third that of conventional plate-fin constructions. Further, and of particular significance, the construction of the above patent results in reduced heat transfer and has low structural strength, resulting in a low pressure rating. Thus, for example, constructions of the type of the above patent will generally only withstand pressures not in excess of about 100 p.s.i., whereas conventional plate-fin heat exchanger constructions will withstand pressures of the order of about 600 p.s.i.

According to a preferred embodiment of the present invention, there is provided a fractionating apparatus or unit comprising two series of corrugated metal sheets disposed in vertical relation, each of the two series of corrugated sheets or plates extending horizontally across the apparatus, the sheets of each series of corrugated sheets being substantially in vertical alignment, but with the second series of corrugated sheets offset from the first series of corrugated sheets. The result is the formation of a plurality of vertically disposed channels or paths formed by the vertically disposed cells of adjacent offset corrugations, with a portion of the alternate offset corrugations of alternate series of corrugations positioned in such vertical flow channels. The two series of corrugated sheets are disposed between vertical partitions or walls which extend to the opposite side walls of the apparatus, forming an enclosed series of the above-noted vertically disposed channels or paths between such partitions, from the lower to the upper end of the apparatus. The fractionating apparatus has an inlet at its lower end for introduction of a gas and an outlet at its upper end for removal of overhead vapor.

A gas to be liquified or a mixture of gases to be separated is caused to pass upwardly from the bottom of each of the vertical channels formed by the two offset series of corrugations noted above, the vapor as it flows upwardly impinging on opposite surfaces of the cell walls of the alternate offset portions of the alternate offset series of corrugations and in contact with a liquid film flowing downwardly on such surfaces.

A series of the above-noted constructions can be placed in side-by-side relation between a series of parallel vertical walls or partitions. According to a preferred embodiment, a plurality of the above-noted fractionating elements can be disposed in alternate relation with a heat transfer pass or passage provided between adjacent fractionating elements. Thus, for example, there can be arranged alternate fractionating elements of the type noted above, spaced from each other by means of a spacer element, e.g., in the form of a vertically disposed corrugated spacer strip, forming vertical passages between the corrugations thereof, for passage of a heat transfer fluid therethrough in contact with adjacent fractionating elements.

If desired, there can be provided a plurality of more than two offset series of corrugated sheets, for example, three or four series of corrugated sheets, each series offset to the same extent from the adjacent series, in providing the fractionating apparatus of this invention.

The fractionating apparatus of the invention provides a more efficient vapor-liquid contact of the mixture undergoing fractionation, and at the same time, maintains the efficiency of the heat transfer surfaces. The novel fractionating apparatus of the invention permits both heat and mass transfer in an efficient manner.

The invention is described in further detail below in connection with the accompanying drawing wherein:

FIG. 1 is a perspective view, partly broken away, of a preferred embodiment of a multiple unit fractionating apparatus employing one type of fractionating unit construction according to the invention;

FIG. 2 is an enlarged vertical sectional detail taken on line 2—2 of FIG. 1;

FIG. 3 is a perspective view, partly broken away, of a multiple unit fractionating apparatus according to another embodiment; and FIG. 4 shows the fractionating apparatus of FIG. 1 assembled to form a fractionating column.

Referring to FIG. 1, there is shown a multiple fractionating unit A in which there is disposed between vertical parallel metal partitions 10 and 11 the fractionating unit 13, comprising two series of corrugated sheets 12 and 14, the respective corrugated sheets 12 being disposed in alternate vertical alignment, with the other series 14 of corrugated sheets alternately disposed in vertical alignment between the first series of corrugated sheets 12, with the sheets 14 offset half a corrugation, see also FIG. 2, from the corrugated sheets 12.

Each of the alternate vertically disposed corrugated sheets 12 is disposed horizontally across the unit from one side wall 15 to the opposite side wall 17 thereof, each of the corrugations 16 of the sheets 12 being substantially square shaped with an angle of 90° between adjacent walls or surfaces of the corrugated sheets, with adjacent alternate longitudinal sides 20 and 22' in contact with adjacent partitions 10 and 11 and connected thereto as by soldering.

The second series of alternate horizontally disposed corrugated sheets 14 are the same as the square corrugated sheets of the first series 12, except that, as noted above, the square corrugations 18 formed by the second series of corrugated sheets 14 are laterally offset about half a corrugation from the adjacent vertically disposed square corrugations 16 of the first set of corrugated sheets 12. However, the amount of offset of one series of corrugations with respect to the other series can be varied as desired, so that the respective offset corrugations can be offset from each other in amount less than or greater than half a corrugation.

Hence, it is seen that the side walls 19 and 21 of vertically disposed square corrugations 16 and 18 form a plurality of vertically disposed baffles in the passage 30 from the lower to the upper end of the unit. Thus, a gas mixture to be separated and passing upwardly through the channels or passages 30 in the units 13, has its flow interrupted by side walls 19 and 21 of the respective alternate offset vertically disposed corrugations 16 and 18, and makes intimate contact and equilibrium with a film of liquid flowing down opposite surfaces of the side walls of such corrugations, effecting an efficient fractionation. Thus, in effect, there is provided by the offset corrugated sheets a plurality of vertical zigzag passages for the gas or fluid in each of the fractionating units 13.

It will be understood that the shape of the corrugations 18 of the series of corrugated sheets 14 can be different from the corrugations 16 of the series of corrugated sheets 12, provided that the corrugations of one series of sheets are offset with respect to the corrugations of the other series of sheets according to the invention.

A plurality of the above described units 13 are disposed in a multiple arrangement in parallel spaced relation to each other, as indicated in FIG. 1, sandwiched between passages formed by providing a vertically disposed corrugated spacer sheet 22 between vertical partitions 10 and 11 of adjacent fractionating units. The corrugated spacers 22 are each formed of a series of corruagtions 24, see also FIG. 2, each disposed at an acute angle to the adjacent corrugation, with the apices 26 between adjacent corrugations 24 in contact with the opposite vertical partitions 10 and 11 and connected thereto as by soldering. Such vertically disposed corrugated spacer sheet 22 thus forms a series of vertical passages 27 extending from the lower to the upper ends of the unit.

A heat transfer medium or fluid is passed upwardly as indicated at 32 through the wedge shaped vertical passages 27 between the corrugations of the spacer 22 to either incrementally add heat to or withdraw heat from the fractionation or distillation units 13 to effect a "differential" distillation in the fractionating units 13 along the length of such unts and achieve a highly efficient fractionation therein.

Now referring to FIG. 3, there is shown a modification of the multiple fractionating unit of FIG. 1, wherein the heat exchange fluid passages 32 and the corrugated sheets 22 therein of FIG. 1 are omitted, and wherein the fractionating units 13 are placed in vertical side-by-side relation with only the vertical partitions 10 and 11 separating the adjacent units, with no fluid heat exchange passage therebetween. Such a multiple unit fractionating system 42 is employed where it is not desired to utilize an external heat exchange fluid to add heat to or to withdraw heat from the respective fractionating units 13.

In FIG. 4 there is shown an assembly of the multiple unit fractionating apparatus A of FIG. 1, in a fractionating column. The unit A is disposed between a pair of end walls 44, and has a lower header 46 and an upper header 48. The upper ends 49 of the fractionating passages 30 of each of the fractionating units 13 are open and communicate with the chamber 50 within the header 48 at the upper end of the column. The upper ends of the heat exchange fluid passages 32 communicate through upper side openings 52 with a plenum or manifold 54 disposed across the column from side wall 15 to side wall 17, and formed by the curved sheet 56 attached to the column above one of the end walls 44. It is seen that the upper ends of the heat exchange fluid passages 27 are closed off at 59 from communication with the upper chamber 50.

An inlet 60 is provided in the lower header 46 and suitably arranged to conduct feed vapor to the lower ends of passages 30 of the fractionating units 13, and an outlet 62 is provided in the top of the upper header 48 to withdraw overhead vapor from the chamber 50 therein. A distillation liquid inlet 63, e.g., for supplying liquid reflux to the fractionating units 13, is also provided in the upper header 48, and a liquid outlet 64 is provided in the bottom of the lower header 46, and arranged to withdraw fractionated liquid from the bottom of passages 30 of the fractionating units 13. A heat transfer fluid inlet 66 is provided in member 56 to introduce such fluid into the manifold 54 and thence into the upper ends of the heat transfer fluid passages 32, and an outlet 68 is provided in the lower end of the column, and arranged to discharge heat exchange fluid from the lower ends of the passages 32. The flow of heat exchange fluid can be in the opposite direction, if desired, as indicated in FIG. 1.

The fractionating apparatus of the invention is of relatively simple and inexpensive construction, employing a plurality of corrugated metal sheets in an arrangement as described herein, and unlike many prior art fractionating constructions, e.g., of the type illustrated in the above-noted patent, will withstand substantial pressures of the order of about 600 p.s.i. The structural components of the apparatus can be formed of any suitable metal such as aluminum, steel, copper, and the like. The construction of the invention provides highly efficient vapor-liquid contact and large heat transfer surfaces to augment heat transfer efficiency. The invention construction particularly provides both heat and mass transfer in a highly efficient manner.

Although I have described certain embodiments of the invention for purposes of illustration, it will be understood that various other modifications of the invention can be made within the spirit of the invention by those skilled in the art, within the scope of the appended claims.

I claim:

1. Fractionating apparatus comprising a plurality of units each having walls, two series of corrugated metal sheets disposed in vertical relation within said walls, each of said series of corrugated sheets extending horizontally across said unit, the sheets of each said series of sheets being substantially in vertical alignment, with each of said series of corrugated sheets offset laterally from the adjacent series of corrugated sheets, and forming a plurality of vertically disposed channels with a portion of the alternate offset corrugations of alternate series of corrugations positioned in such vertical flow channels, an inlet in the lower end of said unit for introduction of a gas, an outlet at its upper end for removal of overhead vapors, said units being disposed in parallel spaced relation, and including spacer means comprising a vertically disposed corrugated metal spacer sheet positioned in the spaces between side walls of adjacent fractionating units, said corrugated metal spacer sheet attached to opposite side walls of said adjacent spaced fractionating units, said spacer sheet extending across said apparatus between the walls thereof, and providing a plurality of vertical fluid passages for a heat transfer fluid between adjacent fractionating units.

2. Fractionating apparatus as defined in claim 1, each of the corrugations of said two series of corrugated sheets being substantially square shaped.

3. Fractionating apparatus as defined in claim 2, wherein the square corrugations of one series of corrugated sheets are laterally offset about half a corrugation from the corrugations of the other adjacent alternate series of corrugated sheets.

4. A fractionating column comprising a fractionating apparatus as defined in claim 1, said gas inlet being connected to the lower ends of each of said fractionating units and said outlet being connected to the upper ends of each of said fractionating units, and including a distillation liquid inlet to the upper ends of each of said fractionating units, a liquid outlet from the lower ends of each of said fractionating units, a heat exchange fluid inlet to said passages between adjacent fractionating units, and a heat exchange fluid outlet from said last mentioned passages.

5. A fractionating column comprising a fractionating apparatus as defined in claim 3, said gas inlet being connected to the lower ends of each of said fractionating units and said outlet being connected to the upper ends of each of said fractionating units, and including a distillation liquid inlet to the upper ends of each of said fractionating units, a liquid outlet from the lower ends of each of said fractionating units, a heat exchange fluid inlet to said passages between adjacent fractionating units, and a heat exchange fluid outlet from said last mentioned passages.

References Cited

UNITED STATES PATENTS

| | | | |
|---|---|---|---|
| 2,494,304 | 1/1950 | McMahon | 62—42 |
| 2,918,265 | 12/1959 | Williams et al. | 261—112 |
| 3,013,781 | 12/1961 | Haselden | 202—158 |
| 3,256,704 | 6/1966 | Becker | 62—42 |
| 3,346,246 | 10/1967 | Loetel et al. | |
| 3,264,832 | 8/1966 | Van Der Ster et al. | 62—42 |
| 3,402,105 | 9/1968 | Sze | 202—158 |
| 3,466,151 | 9/1969 | Sicard | 202—158 |

FOREIGN PATENTS

| | | | |
|---|---|---|---|
| 611,718 | 10/1960 | Italy | 62—42 |

WILBUR L. BASCOMB, JR., Primary Examiner

U.S. Cl. X.R.

202—158, 236; 203—89; 261—112